Nov. 29, 1938.  A. B. GARDELLA  2,138,631
CORD TAKE-UP DEVICE FOR LAMPS AND THE LIKE
Filed March 23, 1936
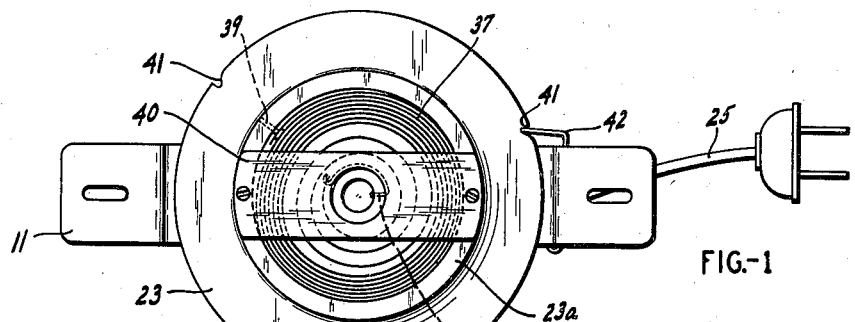
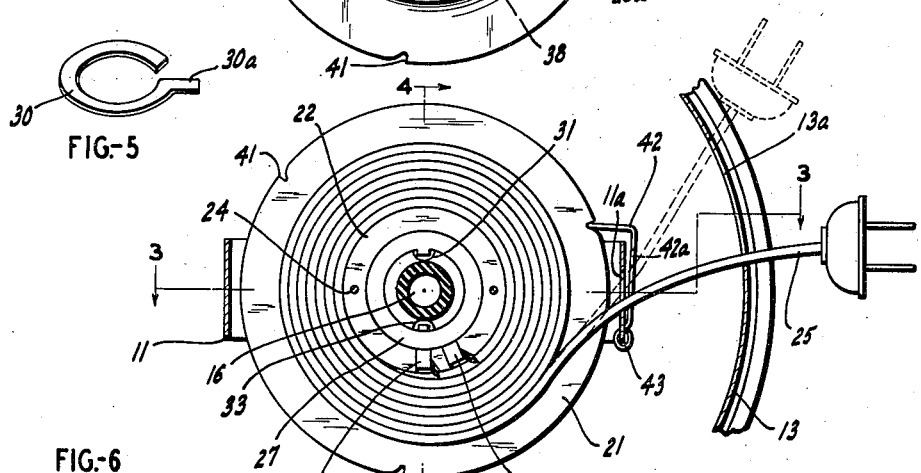
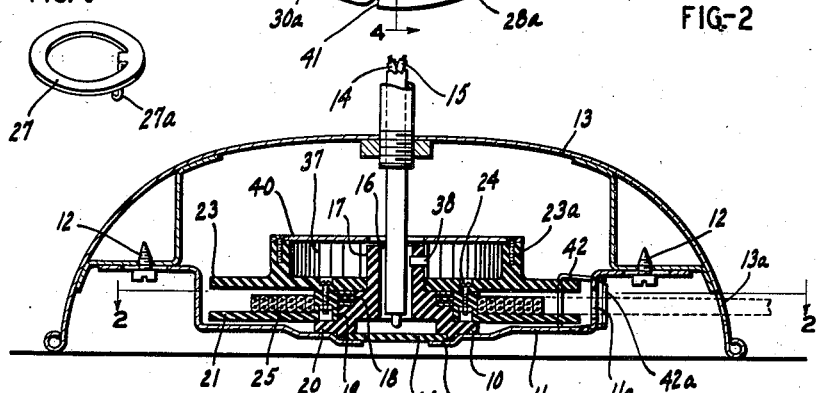
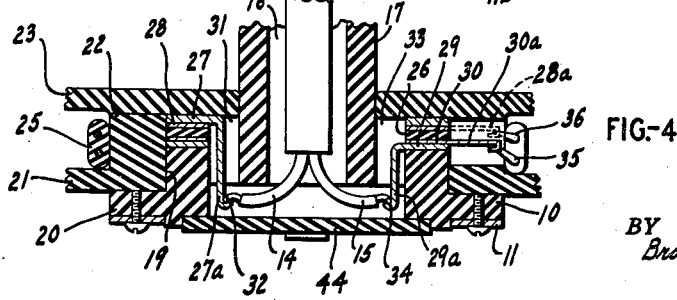
INVENTOR
ALBERT B. GARDELLA
BY
Brockett, Hyde, Higley & Meyer
ATTORNEYS Patented Nov. 29, 1938

2,138,631

UNITED STATES PATENT OFFICE 2,138,631

CORD TAKE-UP DEVICE FOR LAMPS AND THE LIKE

Albert B. Gardella, Cleveland, Ohio, assignor of one-half to George C. Guckes, Lakewood, Ohio Application March 23, 1936, Serial No. 70,291

3 Claims. (Cl. 173—367)

This invention relates to a cord take-up device for use with electrical appliances.

Many electrical appliances, such as lamps and the like are provided with a considerable length of extension cord for attachment to an outlet which supplies the appliance with electrical energy. If the appliance is placed less than the full length of the cord from the outlet the cord is left loose on the floor or table where it is unsightly and likely to be caught and accidentally pulled. The present invention provides a novel take-up device for winding up the extra length of cord when it is not needed.

My invention provides a self-contained unit which may be built into an electrical appliance or which by slight adaptation may be added to any appliance having a hollow base to receive the same. Among the novel features of my invention are the special shape and arrangement of the parts by which the necessary number of parts is reduced to a minimum and by which the necessary electrical contact members are housed in a novel manner. My invention also provides novel detent means for limiting the reeling action of the take-up device and other novel and advantageous features of my device will be apparent from the accompanying drawing and specification.

In the drawing, Fig. 1 is a top view of my device separated from the appliance in which it is used; Fig. 2 is a sectional view along the line 2—2 of Fig. 3, being a top view of the lower portion of the reel and showing a portion of the base of an electrical appliance; Fig. 3 is a sectional view taken substantially diametrically of the take-up device when in position in a hollow base and substantially along the line 3—3 of Fig. 2; Fig. 4 is a partial sectional view taken along the line 4—4 of Fig. 2 and somewhat enlarged to more clearly show the construction; while Figs. 5 and 6 are perspective views of electrical contact rings used in my device.

My take-up device comprises a hub member 10 which is secured to the electrical appliance by a substantially rigid connection, as for instance in the embodiment by rigidly connecting the hub with a bracket 11 which in turn is secured at 12 to an electrical appliance which in the present instance is a hollow base 13 adapted to be utilized as a standard for a lamp to which electrical current is supplied by the conductors 14 and 15. The hub has a central opening 16 therethrough so that the conductors may be brought down centrally through the hub and secured in electrical contact with the take-up device at the base of the hub. The hub has cylindrical portions 17, 18 and 19 of smaller, intermediate and larger diameters, respectively. The hub also has a flange 20 extending radially outward at its base to form a seat for one of the reel disks. The lower reel disk 21 is rotatably mounted on the hub portion 19 of larger diameter and has an upstanding flange 22 adjacent its inner peripheral edge which is coextensive with the hub portion 18 of intermediate diameter. The upper reel disk 23 is rotatably mounted upon the hub portion of smaller diameter 17 and is secured as at 24 to the flange 22 so that the disks provide between them a reel about which the extension cord 25 may be wound. Between the flange 22 and hub portion 18 is thus provided an annular recess in which are mounted two pairs of coacting contact rings separated by a ring 26 of insulating material. The upper pair of contact rings comprises a stationary ring 27 and a rotatable ring 28. The lower pair of contact rings comprises a stationary ring 29 and a rotatable ring 30. Rings 27 and 29 are similar in structure and one of them is shown in Fig. 6. An electrical conductor 27a is rigidly connected with the ring 27 and passes downwardly through an opening 31 in the hub and is connected at its terminal 32 with the conductor cord 14. The ring 29 has a similar conductor 29a which extends through the opening 33 in the hub and is connected at its terminal 34 with the conductor 15. The rotatable rings 28 and 30 are preferably as shown in Fig. 5 where the ring is split and sprung slightly after the manner of a lock washer so that the ring is flexible and extensible in a direction normal to the general plane of the rings. The ring 30 has an extension 30a which extends through an opening in flange 22 and is connected with one of the wires 35 of the extension cord 25. The ring 28 likewise has an extension 28a which passes through flange 22 and is secured to the wire 36 of the cord 25. The parts are so proportioned that when assembled as shown in Figs. 3 and 4 the rings 26 to 30 inclusive substantially fill the annular recess and due to the spring character of rings 28 and 30 all of the rings are held in firm contact between the disk 23 and the hub.

Means is provided for biasing the reel in a direction to take up the excess of extension cord 25 and in the form shown upon the upper reel disk 23 is an upstanding annular flange 23a within which is mounted a spiral spring 37 having its inner end anchored at 38 in the hub and having its outer end anchored at 39 in the flange 23a.

A plate 40 secured to flange 23a holds the spring in position and the connection at 38 prevents the reel from being lifted vertically off the hub although other securing means for this reel might be provided within the scope of my invention.

Detent means is provided for limiting the action of the take-up device and in the form shown upon the peripheries of the reel disks are provided a series of notches 41 into which a detent 42 is adapted to enter and stop the take-up action of the reel. This detent is pivotally mounted in a suitable manner and in the form shown is formed of bent wire secured about the bracket 11 at 43 in such a manner as to bias the detent 42 outwardly away from the reel disks, although an extra spring may be provided for this purpose if desired. The extension cord 25 is led through an opening 11a in the bracket 11 and thence outwardly through a circumferentially elongated opening 13a in the base 13. The detent has a cross member 42a so positioned that when the take-up cord is moved from the position shown in full lines in Fig. 2 laterally to the dotted line position therein, the cord presses upon the detent portion 42a and moves the detent 42 into engagement with one of the notches 41.

When all of the electrical connections have been made, the base of the hub may be closed by a suitable disk member 44 held in place by tongues 11b on the bracket 11 bent over upon the outer face of the disk.

When the device has been secured in position upon a suitable appliance, the reel is wound in a counterclockwise direction as viewed in Figs. 1 and 2 so as to load the spring 37. The cord 25 is then plugged into a suitable source of electrical energy and the excess cord is allowed to wind up on the reel 21—23 to a suitable point, whereupon a lateral movement of the cord 25 as illustrated in Fig. 2 will move the detent into one of the notches 41.

Preferably the hub 10 and the reel disks 21 and 23 are made of electrical insulating material, such as Bakelite, fiber or similar composition so that the contact rings 26 to 30 are totally enclosed in insulating material and protected from dirt.

What I claim is:

1. In a take-up device for an electrical appliance having a hollow base opening downwardly and a pair of electrical conductors extending upwardly from said base, a bracket secured to said base, a hub of insulating material rigidly mounted on said bracket, two reel disks of insulating material rotatably mounted on said hub, an upstanding annular flange on one of said disks extending toward the other disk to form spacing means between said disks, means securing said disks together, there being an annular recess between said hub and said flange, two pairs of coacting contact rings in said recess electrically insulated from each other, each pair comprising a stationary and a rotatable ring, an electrical conductor for each fixed ring secured to said ring and passing through a portion of said hub to the bottom thereof, there being a central opening through said hub, said appliance conductors extending down through said opening and secured one to each fixed ring conductor, an extension cord having a pair of conductors adapted to be connected at one end with a source of electrical energy and connected at their other ends one to each rotatable contact ring, and spring means biasing said disks in a direction to wind up said extension cord between them.

2. In a take-up device for an electrical appliance having two electrical conductors, a hub of electrical insulating material rigidly secured to said appliance, said hub having stepped-up cylindrical portions of small, intermediate and large diameters respectively, two reel disks of insulating material rotatably mounted on said hub on said portions of small and large diameters respectively, an annular flange at the inner edge of said disk of larger internal diameter and coextensive with said hub portion of intermediate diameter, said flange being secured to the other of said disks, two pairs of coacting contact rings surrounding said hub portion of intermediate diameter and electrically insulated from each other, each pair comprising a stationary and a rotatable ring, means connecting said stationary rings one with each appliance conductor, an extension cord having two conductors connected one to each of said rotatable rings, and a spiral spring on the outer face of one of said disks having one end secured to said disk and its other end secured to said hub, whereby to bias said disks in cord take-up direction.

3. In a take-up device for an electrical appliance, a hub substantially rigidly secured to said appliance, two reel disks rotatably mounted on said hub, an annular flange located centrally of one of said disks and extending toward the other disk to form spacing means between said disks, means securing said disks together, there being an annular recess between said hub and said flange, two pairs of coacting contact rings in said recess axially alined and electrically insulated from each other, each pair of rings comprising one fixed against rotative movement relative to said hub and one arranged to rotate with said disks, said fixed rings being electrically connected one with each conductor of said electrical appliance, an extension cord, said rotatable rings being electrically connected one with each conductor of said cord, spring means biasing said disks in a direction to wind up said cord about said flange and between said disks, an enlarged portion on said hub adapted to close one end of said recess, a portion on one of said disks adapted to close the other end of said recess, at least one of said rings being a spring ring flexible and extensible in a direction normal to the general planes through said rings, and the dimensions of said recess and of said rings being so arranged that said spring ring is slightly compressed between said hub and disk portions when the latter are fastened together, whereby said rings are held in intimate contact.

ALBERT B. GARDELLA.